UNITED STATES PATENT OFFICE.

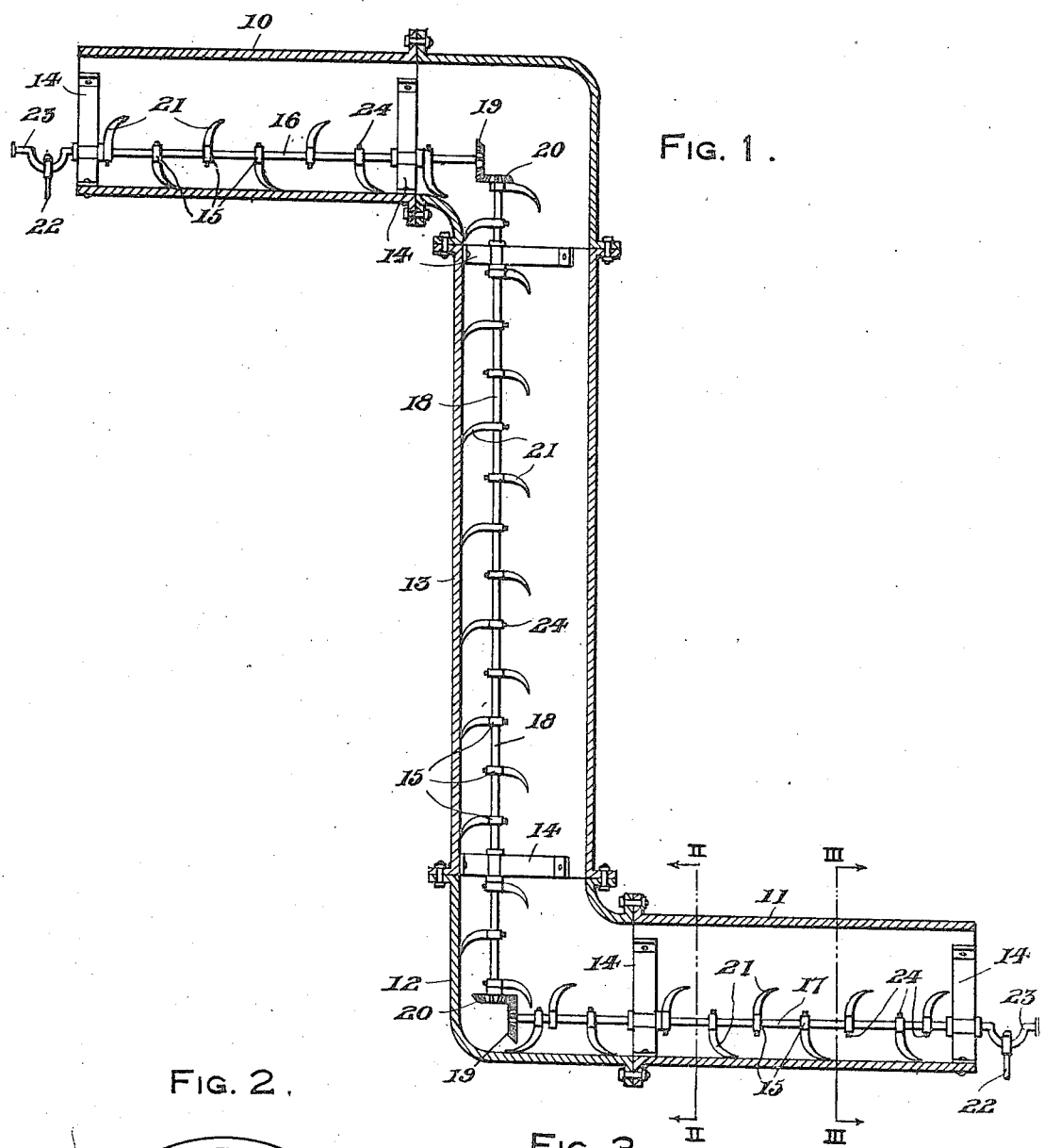

STEPHEN POKOPAC AND JACKP POKOPAC, OF GREENSBURG, PENNSYLVANIA.

PIPE-CLEANER.

1,306,925.          Specification of Letters Patent.     Patented June 17, 1919.

Application filed September 23, 1918. Serial No. 255,361.

*To all whom it may concern:*

Be it known that we, STEPHEN POKOPAC and JACKP POKOPAC, subjects of the King of Hungary, residing at Greensburg, in the county of Westmoreland and State of Pennsylvania, have invented certain new and useful Improvements in Pipe-Cleaners, of which the following is a specification.

The primary object of the invention is the provision of a cleaner for pipes such as waste and sewer pipes adapted for ready operation in cutting grease and other accumulations from the sides of the pipe, the apparatus being easily operable whenever the occasion requires.

A further object of the invention is the provision of a cleaner adapted to be maintained within a pipe of any convenient length and having elbows where sediment and formed particles may readily accumulate, the cleaner being operable whenever desired for dislodging and stirring up the contents of the pipe, thereby facilitating the flow of fluid therethrough.

With these general objects in view, the device consists of the combination and arrangement of parts hereinafter fully described in connection with the accompanying drawing and in which like reference characters designate corresponding parts throughout the several views.

In the drawing,

Figure 1 is a central longitudinal view through a double elbow length of pipe provided with our invention installed therein;

Figs. 2 and 3 are transverse sectional views taken upon lines II—II and III—III respectively of Fig. 1; and Fig. 4 is an elevational view of a portion of the cutting shaft.

Our invention is designed for permanently mounting within pipes for periodically cleaning the same whenever desired and is herein illustrated in connection with two straight sections of pipe 10 and 11 connected by means of elbows 12 with an intermediate communicating section 13 positioned at right-angles to the sections 10 and 11.

Spiders 14 are mounted within each of the sections 10, 11 and 13 adjacent the ends thereof having bearings 15 eccentrically positioned with respect to the pipe section within which the spider is located. The bearings 15 of the spiders of each pipe section are in axial alinement for journaling a crank-shaft 16 within the section 10 and a similar crank-shaft 17 within the section 11 while a knife-shaft 18 is journaled in the spiders of the intermediate section 13.

The inner end of each of said crank-shafts 16 and 17 extends within one of the elbows 12 being provided therein with a pinion 19 in constant mesh with gears 20 upon the opposite ends of the shaft 18. Arcuate-cutting knives 21 are adjustably secured, preferably extending alternately from the opposite sides of the shafts 16, 17 and 18 and adapted for engaging the interior of the pipe sections and elbows at the adjacent side thereof.

Operating means such as piston-rods 22 may be connected to the crank 23 of the shafts 16 and 17 for operating said cranks as well as the intermediate shaft 18 whenever it is desired to cause the knives 21 to cut the sediment or other foreign particles within the pipe from the surface thereof. Set-screws 24 are provided for the knives 21 whereby the latter may be adjusted in position upon the operating shafts. The knives 21 are preferably slightly resilient for cutting and scouring the adjacent interior surfaces of the pipe being cleaned. The shafts 16, 17 and 18 are positioned for engaging the knives 21 with the surface of the pipe upon which the sediment is most adapted to collect such as the lower sides of the sections 10 and 11 herein shown in Fig. 1 and the corresponding side of the section 13 over which slowly moving grease or sediment would pass between the pipe sections 10 and 11.

What we claim as new is:—

1. In combination with a pipe having elbows, spiders secured in spaced relation within said pipe having bearings nearer one side of the pipe than the other side thereof, shafts journaled in said bearings, operative connections between the said shafts, operating means for the shafts at the opposite ends of the pipe, and resiliently curved knives adjustably mounted upon said shafts adapted for engaging the adjacent surface of the pipe during the operation of the shafts.

2. A device of the class described comprising two sections of pipe in parallel planes, an intermediate pipe section, elbows connecting the ends of said intermediate section with the adjacent ends of said parallel sections, spiders secured within opposite ends of each of said pipe sections having alining bearings for each section adjacent corresponding sides of the sections, gear connections upon said shafts within said elbows, operating means for the said shafts outwardly of the pipe, and curved resilient blades adjustably mounted upon the said shafts having paths of movement within the plane of the adjacent inner faces of said pipe sections and elbows.

In testimony whereof we affix our signatures.

STEPHEN POKOPAC.
JACKP POKOPAC.